Dec. 24, 1957  G. H. NEWCOMER ET AL  2,817,304
SKID
Filed Aug. 24, 1955  11 Sheets-Sheet 9

FIG_15_

FIG_16_  FIG_17_  FIG_18_

FIG_19_

INVENTORS:
Garfield H. Newcomer,
Stephen Nagy & Lewis M. Showers,
BY Paul & Paul
ATTORNEYS.

Dec. 24, 1957 G. H. NEWCOMER ET AL 2,817,304
SKID
Filed Aug. 24, 1955 11 Sheets-Sheet 10

INVENTORS:
Garfield H. Newcomer,
Stephen Nagy &
Lewis M. Showers,
BY Paul & Paul
ATTORNEYS.

United States Patent Office 2,817,304
Patented Dec. 24, 1957

2,817,304

SKID

Garfield H. Newcomer, Clifton Heights, Pa., Stephen Nagy, Elmwood Park, Ill., and Lewis M. Showers, Lansdowne, Pa., assignors to The Pennsylvania Railroad Company, Philadelphia, Pa., a corporation of Pennsylvania Application August 24, 1955, Serial No. 530,317

19 Claims. (Cl. 105—369)

This invention relates to a skid for carrying flat or coiled steel. More particularly, this invention concerns a skid which is adapted to be carried with capacity for longitudinal sliding movement on the floor of a railroad car or the like.

It is an object of this invention to provide a means for carrying steel on a movable support, whereby the steel may be easily and quickly loaded and unloaded, but is fully protected against damage due to bumping and jarring in transit. Still another object is to provide a means for carrying coiled steel of various coil sizes without damage either by bumping or jarring action, or by the weather. Still another object of this invention is to provide a versatile and adaptable carrying means for carrying either flat bundles or cylindrical coils of steel, or both.

Other objects and advantages of this invention will further become apparent hereinafter, and in the drawings whereof.

In the interest of clarity, specific terms will be used in the following description. Such terms are not intended to define or limit the scope of the invention, but only to describe the particular apparatus shown in the drawings.

Turning now to the specific forms of the invention selected for illustration in the drawings, and referring now to Figs. 1-5 thereof, a skid is provided with capacity for longitudinal sliding movement along the floor 50 of a movable carrying means such as a gondola car 51 or the like. The floor 50 is conveniently provided with longitudinally extending boards 52, forming restraining guides for the skid.

The skid is supported on a pair of longitudinally extending, transversely spaced slides, each slide being comprehensively designated by the number 53. Each slide consists of an outer (wooden) beam 54 and an inner (wooden) beam 55 arranged adjacent to one another. The upper surfaces 56 of beams 54, 55 are downwardly and inwardly inclined, and lie in the same plane, forming a cradle for the load, which may be a plurality of cylindrical coils C of steel, for example.

Fixed to the ends of the slides 53 are transversely arranged beams 57 which support end pieces 58, each beam 57 carrying a plurality of aligned, transversely spaced bumpers 60 which consist of rubber or any suitable cushioning material. Bumpers 60 cushion the skid against the ends of gondola car 51 or, when the car carries more than one skid, matching sets of bumpers 60 on the skids cushion the skids against shock of impact with one another.

Figure 12:
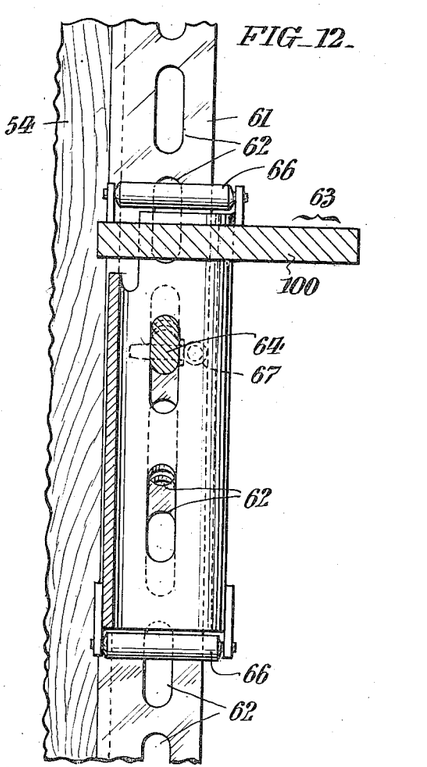

Each slide 53 carries, along its outer edge, a longitudinally extending track 61 (see Figs. 7, 8) having elongated slots 62. Two bulkheads or end walls comprehensively designated 63 are supported on rollers 66 for rolling along the track 61, each bulkhead being longitudinally adjustable thereon. Each end bulkhead 63 has structural means provided with openings which are aligned with the slots 62, and wedge pins 64 are provided which extend through the slots 62 and through the bulkhead openings to secure each end bulkhead 63 in fixed longitudinal position on the track 61 (see also Fig. 12). Wedge pins 64 can be secured by safety pins 67 which extend through the wedge pins 64.

Also carried by the track 61 is a floating bulkhead 65 which is supported on rollers 68 and is free to roll along the track 61 unless the skid is loaded, in which case any rolling movement is impeded by the load.

Figures 1, 4:
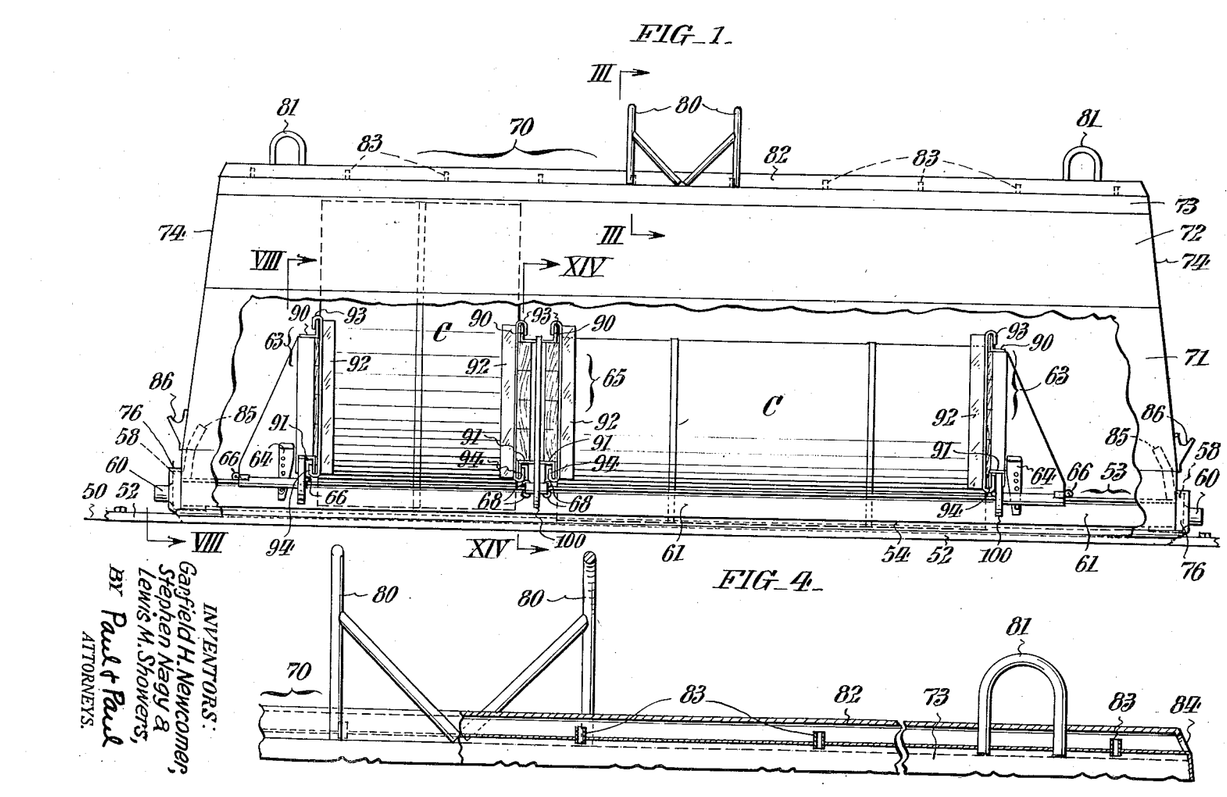
Fig. 1 represents a view in side elevation of a skid embodying features of this invention, such skid being provided with a cover, part of which is broken away in order to reveal important details.
Fig. 4 represents an enlarged sectional view of the upper portion of the cover, taken as indicated by the lines and arrows IV—IV which appear in Fig. 2.
Figures 2, 3:
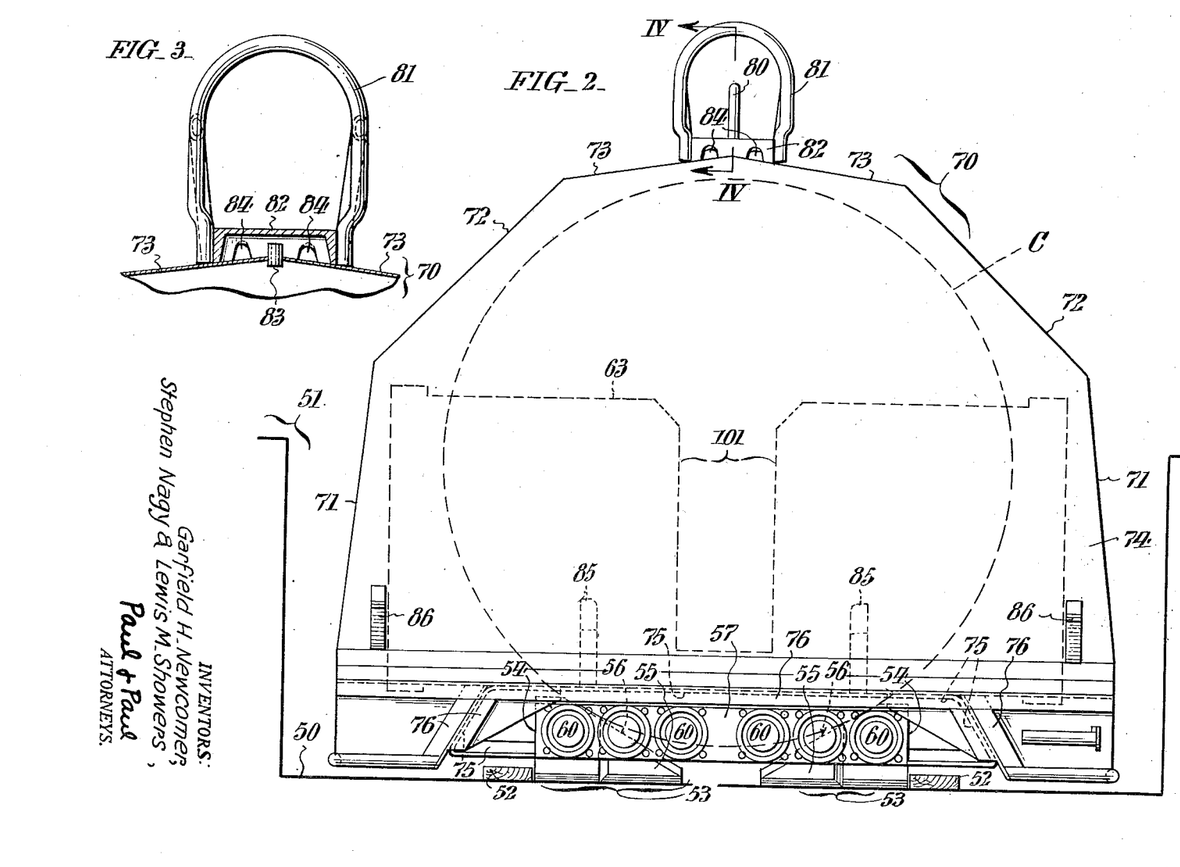
Fig. 2 represents an end view of the skid and cover shown in Fig. 1, positioned on the floor of a gondola car.
Fig. 3 represents an enlarged sectional view of the upper portion of the cover of Fig. 2, taken as indicated by the lines and arrows III—III which appear in Fig. 1.
Figure 5:
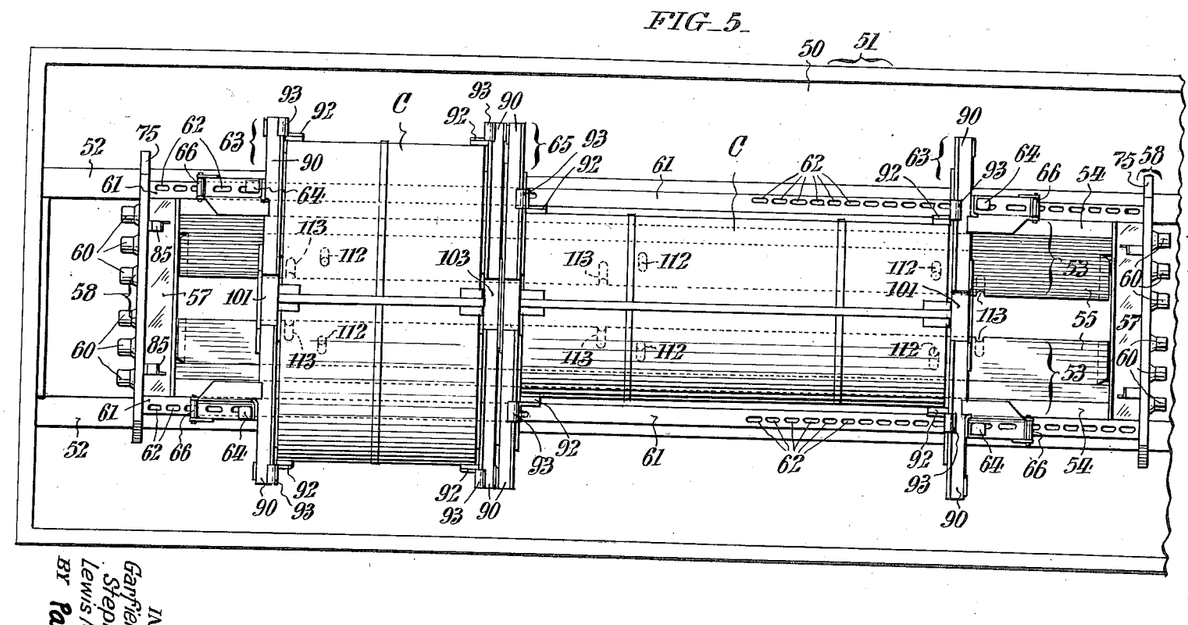
Fig. 5 represents a top plan view of the skid of Figs. 1 and 2.

Figs. 1-3 show the arrangement of a cover piece 70 which has upwardly inwardly inclined side walls 71, 72, a sloped top 73, and inclined end walls 74. At each end the skid end pieces 58 are in form of generally trapezoidal frameworks 75 (see also Figs. 6, 8) which engage similarly shaped frame portions 76 on the cover 70 to support the cover 70.

Figs. 1 and 2 show how the cover is provided with central and end lifting loops 80, 81, respectively, fastened to a channel iron 82 for engagement by a crane or other lifting device. Fig. 4 shows the details of a venting means provided at the top of cover piece 70, including spaced tubes 83 located along the juncture of the top plates 73 and extending above it, communicating with the atmosphere through vent holes 84 formed in the end closures of channel iron 82. Since the tops of tubes 83 are higher than the bottoms of vent holes 84, rain or other fluid entering the vent holes 84 drains back out the vent holes 84 and does not flow down the tubes 83.

Figure 6:
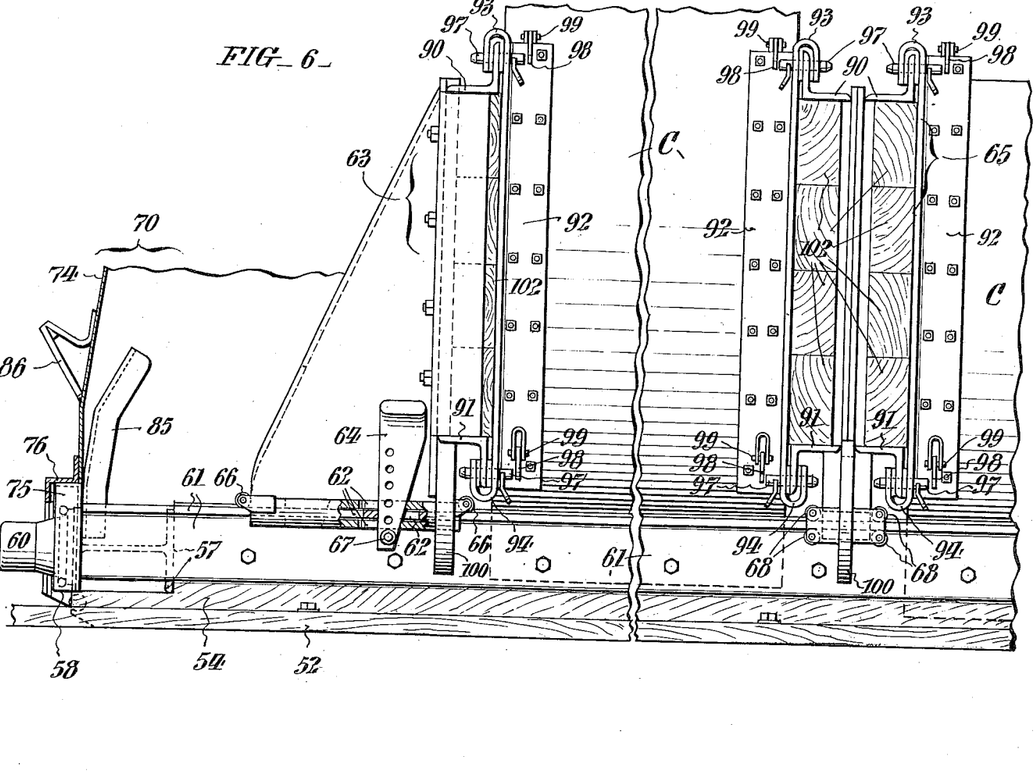
Fig. 6 represents an enlarged view in side elevation, showing the details of construction of the end wall and of the floating bulkhead of the skid represented in the foregoing figures.
Figure 23:
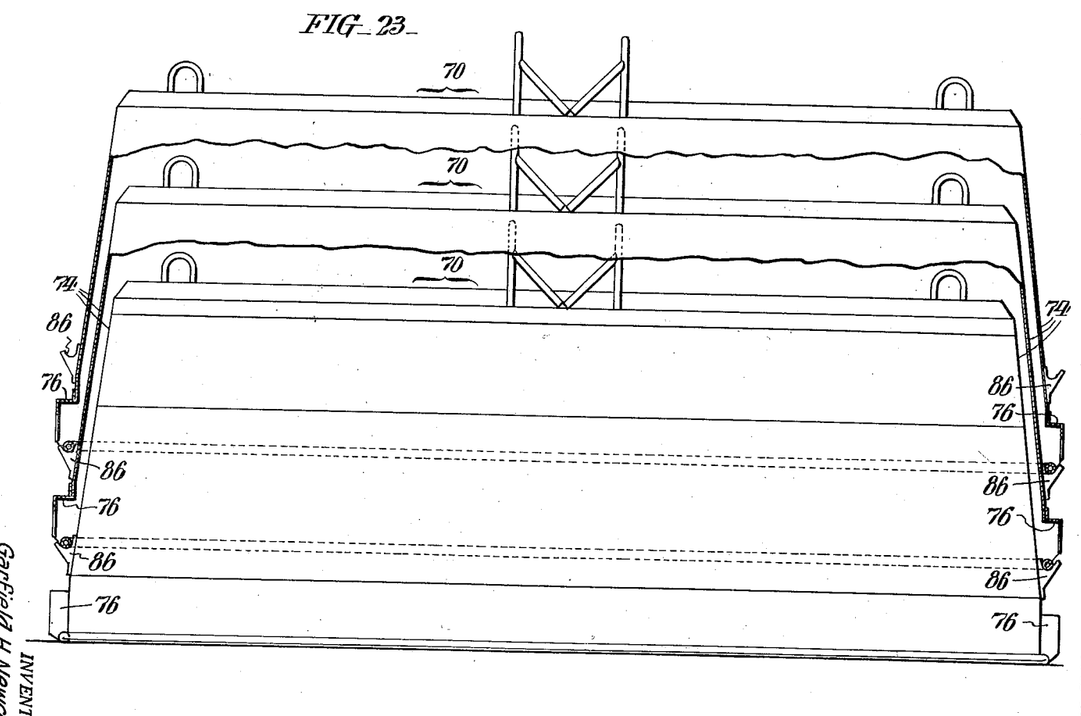
Fig. 23 represents a view showing how a plurality of covers may be arranged in nested relation.

Fig. 6 shows an upwardly inclined guide bar 85 two of which are provided at each end and carried by the skid and arranged to guide the cover 70 into place as the cover is lowered onto the skid. Also, each cover is provided with supporting hooks 86, which comprise rests for another similar cover 70, when it is desired to stack several covers in nested relation, as shown in Fig. 23.

Figure 7:
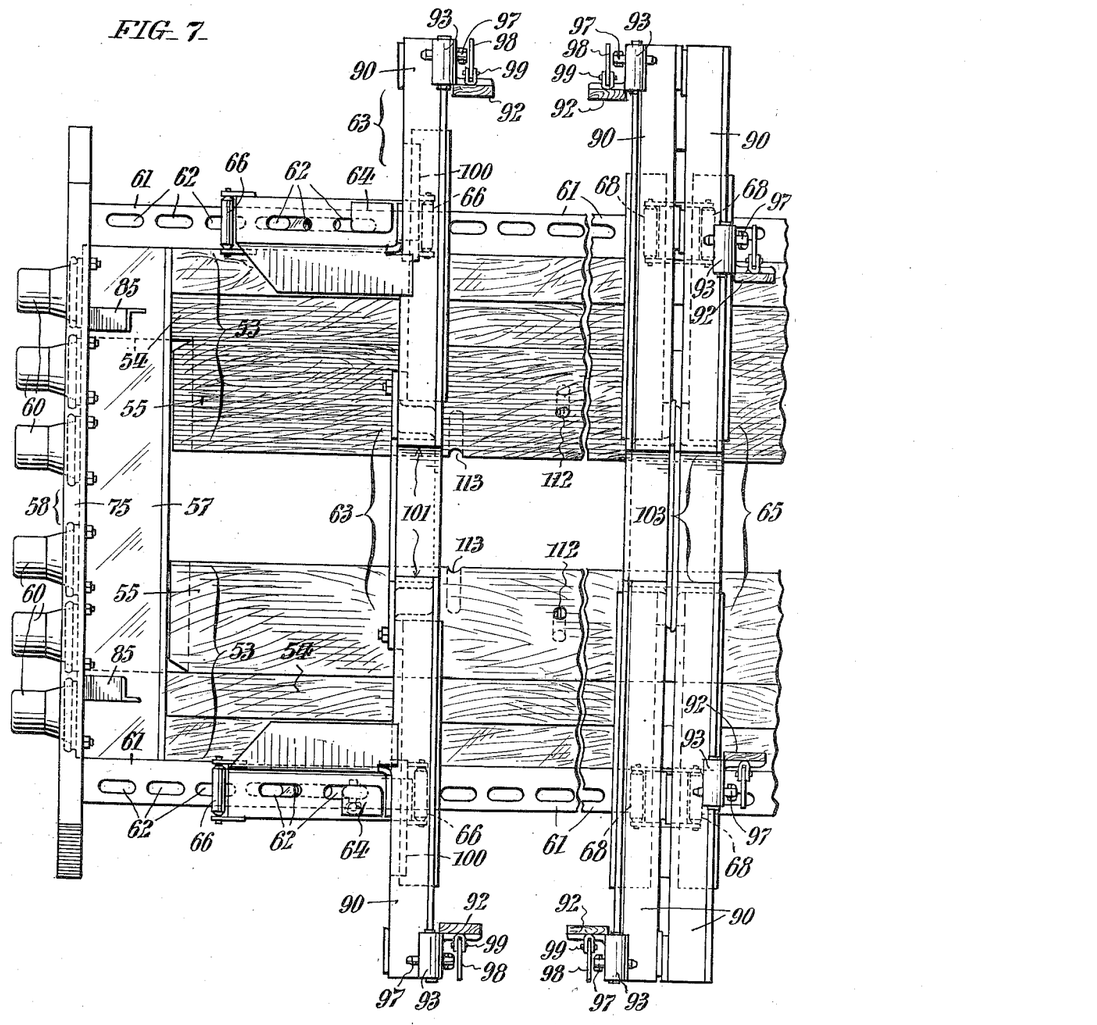
Fig. 7 represents a top plan view corresponding to Fig. 6.
Figure 8:
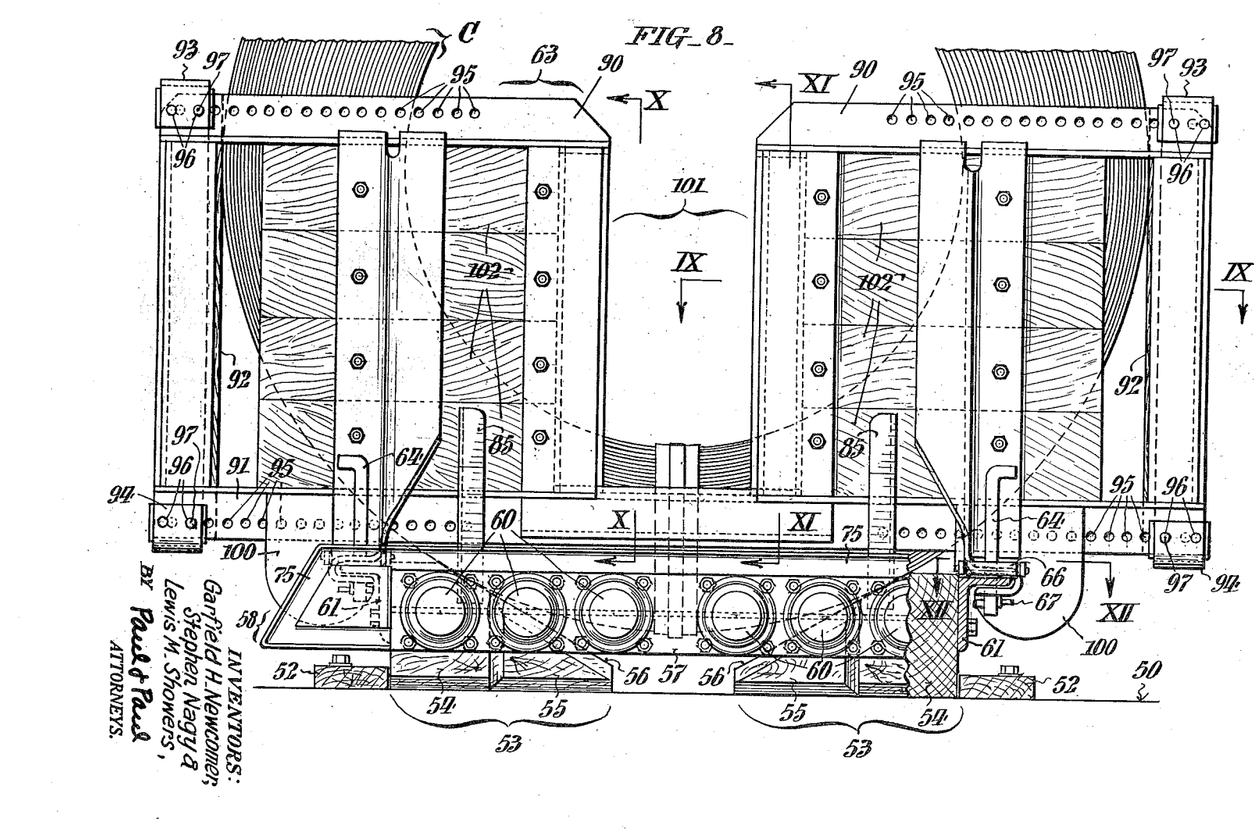
Fig. 8 represents an end view taken as indicated by the lines and arrows VIII—VIII which appear in Fig. 1.
Figure 13:
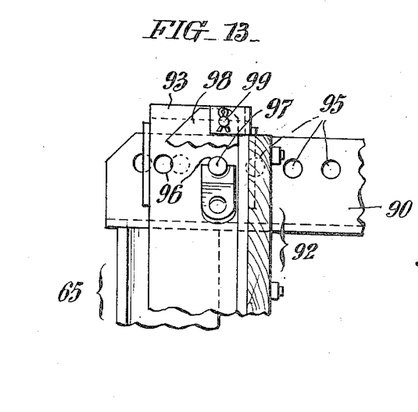
Fig. 13 represents an enlarged view of the upper left hand corner of the apparatus shown in Fig. 14.

Turning now to Figs. 6, 7 and 8 of the drawings, each end wall or bulkhead 63 and each floating bulkhead 65 carries upper transverse rails 90 and lower transverse rails 91. Load retaining angles 92 are provided, having upper and lower track-engaging members 93, 94, respectively, of generally U-formation, which engage the rails 90, 91 with capacity for transverse sliding movement thereon. The rails 90, 91 have aligned holes 95 therein, the coupling slides 93, 94 have similar holes 96 (see also Fig. 13), and pins 97 are provided for securing the retaining angles 92 in adjusted position. Manually operable stops are provided for the pin ends, comprising plates 98 pivoted at 99.

Accordingly, it will be understood that means are provided for moving the load retaining angles 92 inwardly against the load, and for securing them in that position.

Figs. 6, 7 and 8 also show how the bulkheads are secured against displacement from the track 61. Each bulkhead carries pairs of heavy hooks 100 extending both above and below the horizontal flange of the track 61. Each hook 100 carries rollers 66, 68 for shifting the bulkheads along the track, as heretofore described.

Figure 9:
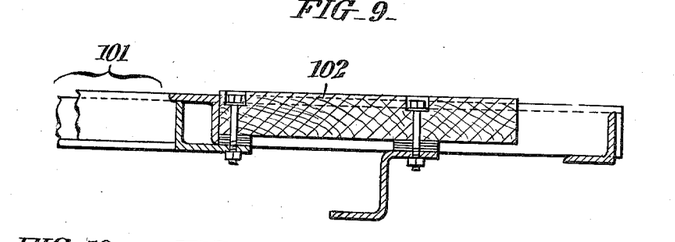
Figs. 9, 10, 11 and 12 represent sectional views taken as indicated by the lines and arrows IX—IX, X—X, XI—XI and XII—XII, respectively, which appear in Fig. 8.
Figure 10:
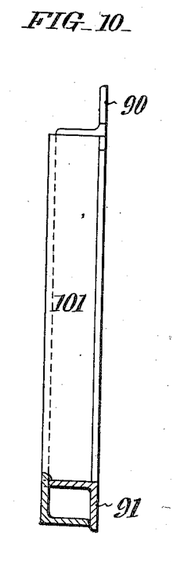
Figure 11:
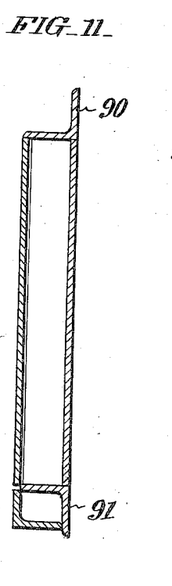

Referring more particularly to Fig. 8, each bulkhead 63 is vertically divided or slotted at 101 to provide space for the insertion of a C hook (or other lifting element) into the center of the coil C for lifting or lowering the coil. The bulkhead is suitably reinforced around the slotted area, as illustrated in Figures 9, 10 and 11. Figs. 8 and 9 also show that the bulkhead surface which is exposed to the load is preferably wood 102, although other materials may be used.

Figure 14:
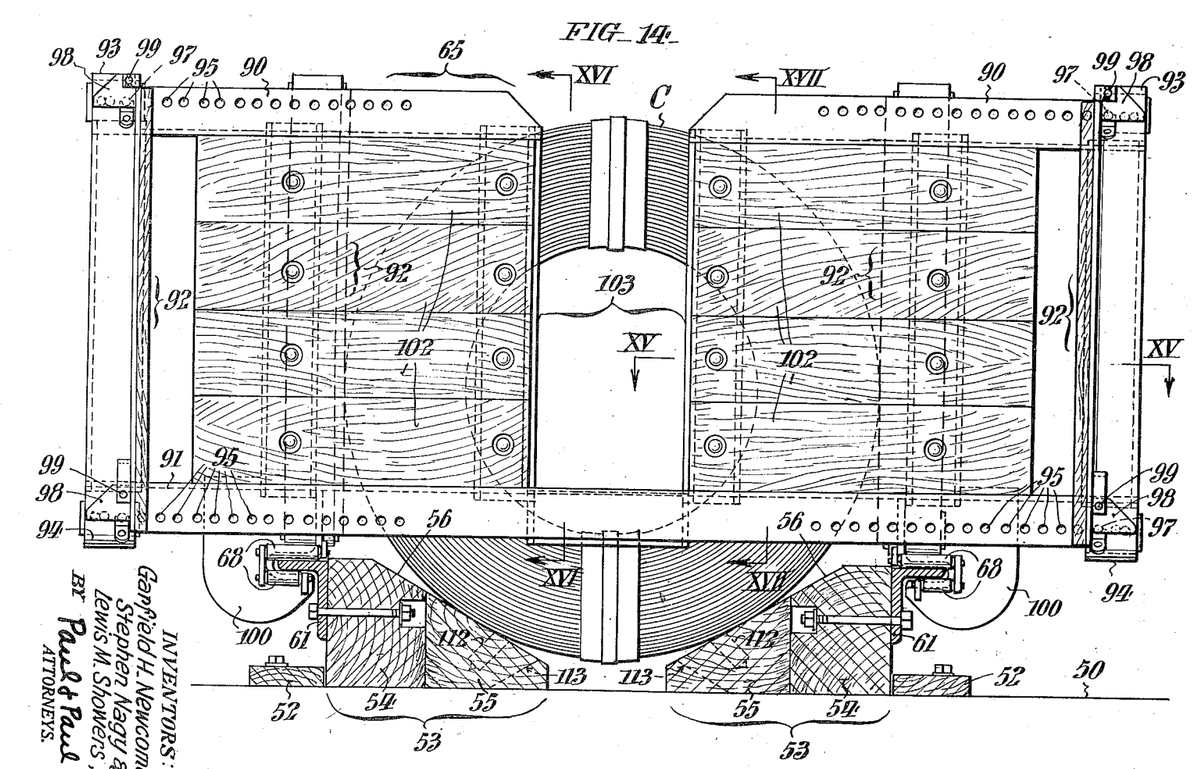
Fig. 14 represents an enlarged view taken as indicated by the lines and arrows XIV—XIV which appear in Fig. 1.
Figure 15:
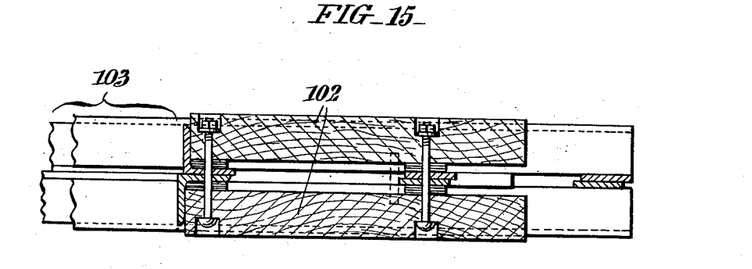
Figs. 15, 16 and 17 represent views taken as indicated by the lines and arrows XV—XV, XVI—XVI and XVII—XVII, respectively, which appear in Fig. 14.
Figures 16, 17:
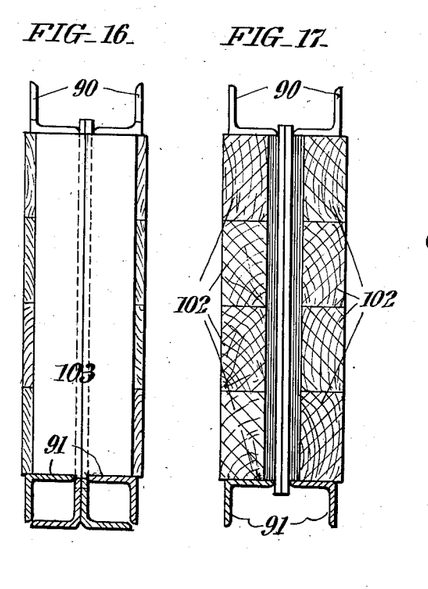

Referring now to Fig. 14, the floating bulkhead 65 has a central upper slotted area 103 similar to the slotted portion 101 of bulkheads 63 previously referred to. Floating bulkhead 65 is suitably reinforced in the area of the slotted portion, as indicated in Figs. 15, 16 and 17.

Figure 20:
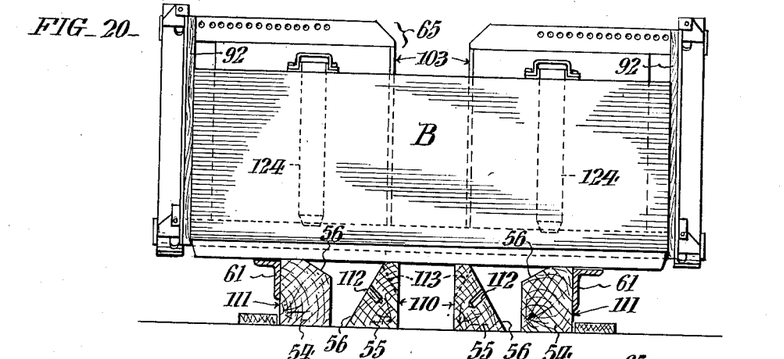
Fig. 20 represents a transverse sectional view similar to Fig. 14, showing how the skid means is arranged in order to carry bundles of flat sheets arranged cross-wise.

Turning now to Fig. 20, it will be observed that a flat bundle B of sheets is mounted on the skid, instead of the coil C heretofore described. To support the bundle centrally, the inner beams 55 have been moved inwardly away from the outer beams 54 and turned ninety degrees about their axes to attain sufficient height to support the bundle. The surfaces 110, which are the bases of the beams 55 when a coiled load is being carried, have a length substantially equal to the length of the upright surfaces 111 of the outer beams 54. Holes 112 are provided in the inclined surfaces 56 of beams 55 for engagement by a suitable tool to effect the turning movements of the inner beams 55. Grooves 113 may also be provided, as shown in Figs. 7 and 14.

Figure 18:
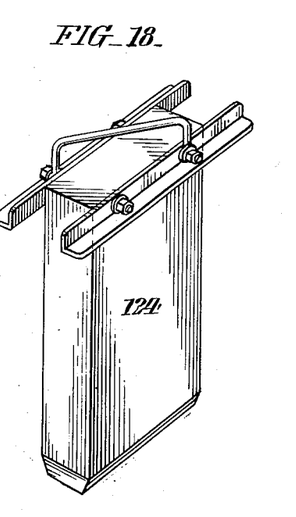
Fig. 18 represents a view in perspective of a spacer block which is inserted between bundles of flat sheets.
Figure 19:
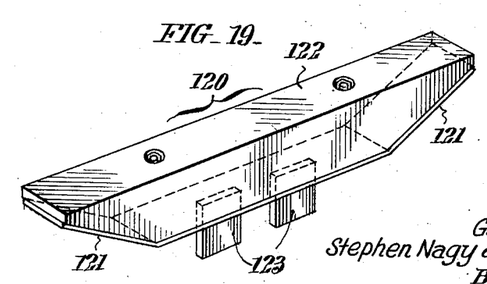
Fig. 19 represents a view in perspective of a cross-bar support which constitutes another component of the skid means.
Figure 21:
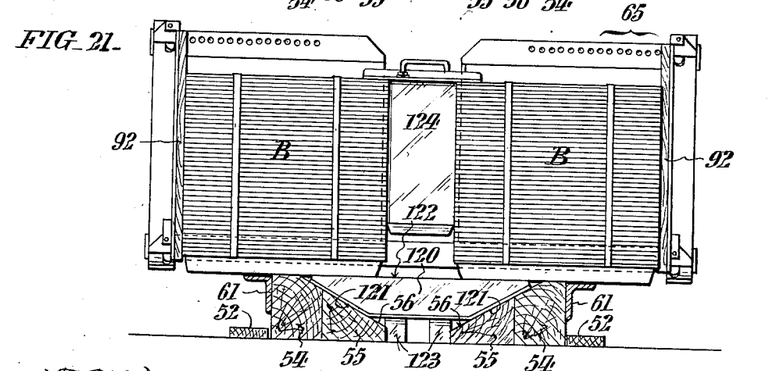
Fig. 21 represents a view similar to Fig. 20 showing how the skid means may be arranged to carry bundles of flat sheets which extend lengthwise.

Fig. 21 shows a supporting means for pairs of flat bundles B arranged lengthwise. A cross bar support 120 (see also Fig. 19) is provided, having inclined lower surfaces 121 matching the inclination of the surfaces 56 of the beams 54, 55. Cross bar support 120 has a flat upper surface 122 and has spacer legs 123 which extend down between the inner surfaces of the inner beams 55 of the skid. Also, one or more spacer blocks 124 (see also Fig. 18) may be provided between the bundles B. Spacer blocks 124 maintain the proper spacing between bundles, assuring that a grapple or other lifting means will have sufficient clearance for insertion between the bundles.

Figure 22:
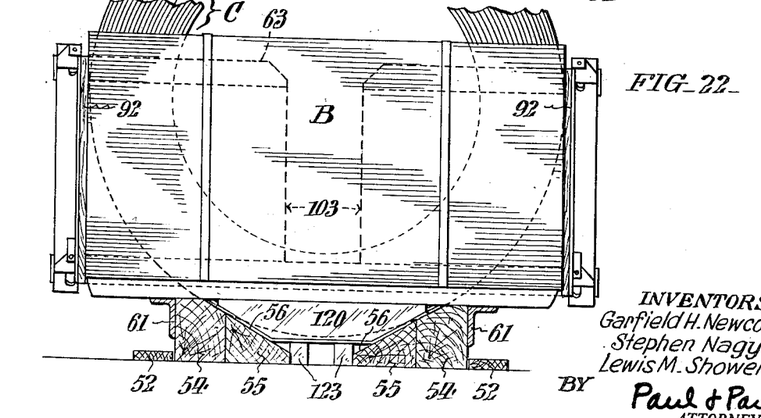
Fig. 22 represents a view similar to Figs. 20 and 21, showing how a skid may be arranged to carry combined coils and bundles of flat sheets.

As shown in Fig. 22, the skid is ideally adapted for carrying both bundles and coils, since the inner beams 55 may be retained in the coil-supporting position and cross bar supports 120 inserted to support the flat bundles.

It will accordingly be appreciated that skids in accordance with this invention are ideally suited for handling loads of various forms, shapes and sizes, either individually or in various combinations. At all times any portion of the load, or even the entire load, may be unloaded, loaded, or shifted from one position to another by conventional lifting devices. The vented cover is similarly handled, and protects steel or other cargo from the weather.

Although freight cars are normally subjected to numerous jolts and other concussions, the load is tightly secured to the skid and is protected against damage. The skid itself has capacity for limited sliding movement along the floor of the railroad car (or other vehicle), but the bumpers 60 cushion any shocks of impact. It has been found very desirable to allow the skid to slide along the floor, since the sliding friction dissipates some of the force of a jolt or impact when the car is stopped or started, for example.

It will be appreciated that one, two or more skids may be installed in a gondola car or the like. In practice, the skid is normally left in the car and the cargo loaded directly on the skid. This, together with the use of accessories as heretofore described, makes for ease and rapidity of loading and unloading, as well as versatility in handling loads of different sizes and shapes.

Various modifications may be made. While we have disclosed bulkheads having upper central slotted areas, the bulkheads may be fully divided in such a way that two transversely spaced bulkheads are provided in the same plane. Other similar modifications will readily occur to persons well versed in the art.

Although this invention has been described with reference to specific forms thereof, it will be appreciated that various other modifications may be made, including the substitution of equivalent elements for those shown and described, the use of certain features independently of others, and reversals of parts, all without departing from the spirit or scope of the invention as defined in the appended claims.

Having thus described our invention, we claim:

1. A combined skid and carrier therefor comprising means forming substantially horizontal, longitudinally extending trackways on said carrier, a pair of longitudinally extending slides arranged in the trackways, transversely arranged end bulkheads extending across the space above and between said slides, said bulkheads being supported on said slides, cushioning means fixed to said slides, means for fixing said end bulkheads to said slides, and a floating bulkhead located between said end bulkheads, said floating bulkhead being longitudinally slidable along and on top of said slides.

2. The combined skid and carrier defined in claim 1 wherein each said slide has an inwardly inclined load supporting portion whereby said slides form a cradle for a coiled load.

3. The combined skid and carrier defined in claim 2 wherein each slide consists of two longitudinally arranged inner and outer sections, the inner section being free of said outer section and having a transverse dimension which is approximately equal to the height of said outer section.

4. The combination of claim 3, wherein angled indentations are provided in said inner sections, whereby said inner sections may be engaged and turned over.

5. The combined skid and carrier defined in claim 1 wherein rails are provided on each said slide, said rails having spaced slots thereon, and wherein said end bulkheads have slotted portions arranged above and below said rail for registration with the rail slots, and wherein locking pins are provided for insertion through said slots to secure said end bulkheads with respect to said slides.

6. The combined skid and carrier defined in claim 5 wherein said locking pins are wedge shaped.

7. The combined skid and carrier defined in claim 1 wherein rails are provided extending along said slides and wherein said floating bulkhead carries rollers engaging said rails.

8. The combined skid and carrier defined in claim 1 wherein said floating bulkhead has a substantially vertically arranged central slotted portion which is open at the top of said floating bulkhead.

9. A skid for a railroad car or the like comprising a longitudinally extending slidable base, transversely arranged bulkheads carried by said base, each bulkhead having upper and lower rails extending respectively along its upper and lower edges, load retaining means arranged for connection to the bulkheads, and locking means engaging said retaining means for locking said retaining means to said bulkheads.

10. The skid defined in claim 9 wherein said load retaining means carries a pair of track-engaging means arranged to couple with said bulkhead rails for sliding movement along said rails.

11. The skid defined in claim 10 wherein said locking means comprises a pin extending through corresponding holes formed in said track-engaging members and rails.

12. A skid for carrying loads of different shapes either flat or rounded in a railroad car comprising supporting means for the load, confining means for confining the load between the ends of said supporting means, a floating bulkhead carried by said supporting means with capacity for sliding movement toward and from said confining means, said supporting means including spaced pairs of longitudinally arranged elongated slides, the spaced slides having upper surfaces which are inclined downwardly toward one another, for cradling a generally cylindrical load, and a cross bar support for supporting a generaly flat load having a flat upper surface in the plane of the upper surfaces of said slides, and having inclined lower side edges which are inclined at substantially the same angles as said upper surfaces of said slides, and which coact with said upper surfaces so that said cross bar support may be supported on said slides.

13. The skid defined in claim 12, wherein spacer pieces are fixed to the bottom of said cross bar support with their outer edges spaced from one another at a distance substantially equal to the distance between the inner edges of the respective slides.

14. A skid for carrying a coiled load in a railroad car or the like, comprising longitudinally arranged slides for carrying the load slidably forwardly and rearwardly in said car, means connecting the slides, said slides having upper surfaces which are inclined downwardly toward one another, for cradling said coiled load, a substantially rigid cover, and supporting means on said skid for carrying said cover.

15. The skid defined in claim 14, wherein said supporting means has a pair of spaced, parallel generally trapezoidal frames, and wherein said cover member has inclined frame members corresponding in shape to portions of said trapezoid, whereby the respective frame members nest with one another forming a support for the cover member.

16. The skid defined in claim 15, wherein an inwardly inclined angle guide is provided on each of said frames for guiding said cover when said cover is lowered on said frame.

17. A combined skid and carrier comprising means forming substantially horizontal, longitudinally extending trackways on said carrier, a pair of longitudinally extending slides arranged for reciprocating sliding movement adjacent and parallel to the longitudinally extending trackways between the ends of the carrier, a plurality of transverse bulkheads supported on said slides, a floating transverse bulkhead supported on said slides intermediate the bulkheads first mentioned, with capacity for movement along said slides, and cushioning means arranged intermediate the ends of the slides and the ends of the carrier.

18. The combined skid and carrier defined in claim 17 wherein a transverse bulkhead has a substantially vertically arranged central slotted portion which is open at the top of said bulkhead.

19. The combined skid and carrier defined in claim 17 wherein said slides are frictionally engaged upon said carrier.

References Cited in the file of this patent

UNITED STATES PATENTS

| | | |
|---|---|---|
| 525,186 | Bowley | Aug. 28, 1894 |
| 1,081,853 | Miller | Dec. 16, 1913 |
| 1,745,057 | Romine | Jan. 28, 1930 |
| 1,871,453 | Cobb | Aug. 16, 1932 |
| 2,028,366 | Warren | Jan. 21, 1936 |
| 2,065,649 | Burke | Dec. 29, 1936 |

FOREIGN PATENTS

| | | |
|---|---|---|
| 256,225 | Italy | Dec. 15, 1927 |